United States Patent
Weng et al.

(10) Patent No.: US 8,098,420 B2
(45) Date of Patent: Jan. 17, 2012

(54) DISPLAY METHOD OF ELECTROPHORESIS DISPLAY DEVICE

(75) Inventors: Ming-Chi Weng, Kinmen County (TW); Hung-Hsiang Chen, Taoyuan County (TW); Yi-Nan Chu, Changhua County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 83 days.

(21) Appl. No.: 12/774,404

(22) Filed: May 5, 2010

(65) Prior Publication Data
US 2011/0157680 A1    Jun. 30, 2011

(30) Foreign Application Priority Data
Dec. 25, 2009   (TW) ................................ 98144986 A

(51) Int. Cl.
*G02B 26/00* (2006.01)
*G09G 3/34* (2006.01)
*G09G 5/10* (2006.01)
(52) U.S. Cl. .................... 359/296; 345/107; 345/690
(58) Field of Classification Search .................. 359/296, 359/245, 253, 272; 345/76, 77, 88, 89, 107, 345/419, 522, 600, 605, 690
See application file for complete search history.

(56) References Cited

U.S. PATENT DOCUMENTS

| | | | | |
|---|---|---|---|---|
| 7,528,822 B2 * | 5/2009 | Amundson et al. | ........... | 345/107 |
| 7,701,436 B2 * | 4/2010 | Miyasaka | ...................... | 345/107 |
| 7,773,102 B2 * | 8/2010 | Lee | ............................... | 345/690 |
| 8,013,880 B2 * | 9/2011 | Lee | ............................... | 345/690 |
| 2006/0139309 A1 | 6/2006 | Miyasaka | | |
| 2008/0136773 A1 * | 6/2008 | Kim et al. | ...................... | 345/107 |
| 2009/0102769 A1 * | 4/2009 | Kouno et al. | .................... | 345/88 |

FOREIGN PATENT DOCUMENTS
CN       101373580 A      2/2009

* cited by examiner

*Primary Examiner* — Loha Ben
(74) *Attorney, Agent, or Firm* — Muncy, Geissler, Olds & Lowe, PLLC

(57) ABSTRACT

A display method of an electrophoresis display (EPD) device having a display area and a plurality of pixels located in the display area is provided. In the display method, firstly, the display area is divided into a plurality of unit areas. A plurality of pixels exist in each of the unit areas. Then, in some unit areas, at least two pixels in each of the unit areas are enabled to respectively display a first color and a second color, such that the first colors and the second colors are mixed to achieve a mixed color in vision. The first color has a maximum gray-level value. The second color has a minimum gray-level value. A gray-level value of the mixed color is between the maximum gray-level value and the minimum gray-level value.

7 Claims, 8 Drawing Sheets

DISPLAY METHOD OF ELECTROPHORESIS DISPLAY DEVICE

CROSS-REFERENCE TO RELATED APPLICATION

This application claims the benefit of Taiwan Patent Application No. 098144986, filed on Dec. 25, 2009, which is hereby incorporated by reference for all purposes as if fully set forth herein.

BACKGROUND OF THE INVENTION

1. Field of Invention

The present invention relates to a display method of a display device, and more particularly to a display method of an electrophoresis display (EPD) device.

2. Related Art

An EPD device is a novel display device recently developed in the field of displaying technology, and is currently mostly applied to electronic papers (e-papers), electronic books, electronic billboards, and electronic tags. The EPD device is a reflective display device, that is, the EPD device presents images by using the reflection of light. Therefore, compared with the commonly used thin-film transistor liquid crystal displays (TFT LCDs), the EPD device displays images without using any backlight sources.

FIG. 1A is a schematic cross-sectional view of a conventional EPD device. Referring to FIG. 1A, a conventional EPD device 100 has a plurality of pixels (not shown), and includes an electrophoretic solution 110, a plurality of charged particles 120, a plurality of common electrodes 130 (only one is shown in FIG. 1A), a plurality of pixel electrodes 140 (only one is shown in FIG. 1A), and a plurality of transistors (not shown). The pixel electrodes 140 are generally integrated with the transistors to form an active component array substrate, which substantially has the same structure as a TFT array substrate of the current TFT LCD.

Both the electrophoretic solution 110 and the charged particles 120 are located between the common electrodes 130 and the pixel electrodes 140, and the charged particles 120 are distributed in the electrophoretic solution 110. The net charge of each charged particle 120 is not equal to zero, and is positive or negative. In other words, the charged particles 120 are particles with positive or negative charges, rather than neutral particles.

When a voltage is applied to the pixel electrode 140, an electric field is generated between the pixel electrode 140 and the common electrode 130, and upon being driven by the electric field, the charged particles 120 start to move. In detail, when the charged particles 120 are all with positive charges, and a positive voltage is applied to the pixel electrode 140, the charged particles 120 move towards the common electrode 130. When the charged particles 120 are all with positive charges, and a negative voltage is applied to the pixel electrode 140, the charged particles 120 move towards the pixel electrode 140.

The EPD device 100 generally displays an image at the common electrode 130, so that a user usually views the image from the common electrode 130. In a certain pixel of the EPD device 100, the closer the charged particles 120 approach the common electrode 130, the color presented by the pixel will be more similar to the color of the charged particles 120; on the contrary, the further the charged particles 120 move away from the common electrode 130, the color presented by the pixel will be more similar to the color of the electrophoretic solution 110. By changing the voltage applied to the pixel electrode 140, the distance between the charged particles 120 and the common electrode 130 can be adjusted, so as to enable the pixels of the EPD device 100 to display colors with different gray levels.

In addition, when the EPD device 100 is in a power-off or low-power state, the overall distance between the charged particles 120 and the common electrode 130 is not changed, so that the image displayed by the EPD device 100 remains and does not disappear. Once the image needs to be refreshed, the distance between the charged particles 120 and the common electrode 130 is changed. Therefore, the EPD device 100 has an image memory capability.

FIG. 1B is a voltage timing chart when the EPD device in FIG. 1A is driven. Referring to FIGS. 1A and 1B, when the EPD device 100 refreshes the image, firstly, a reset time R1 is required and passed. During the reset time R1, the pixel electrode 140 receives a reset voltage Vr, such that all of the charged particles 120 are enabled to move to the same position, for example, all of the charged particles 120 move to the common electrode 130 or the pixel electrode 140.

After the reset time R1 elapsed, a data write time W1 is passed, and the pixel electrode 140 receives a write voltage Vw1 to adjust the distance between the charged particles 120 and the common electrode 130, so as to display colors with different gray levels. Since all of the charged particles 120 have moved to the same position (generally at the common electrodes 130 or the pixel electrodes 140) under the influence of the reset voltage Vr before the write voltage Vw1 is received, the pixels can display colors with correct gray levels only when the pixel electrode 140 receives the write voltage Vw1, such that the image of the EPD device 100 is not distorted.

However, under the influence of the reset time R1, the EPD device 100 has to spend much time on refreshing the image, thereby resulting in a low image refresh rate of the EPD device 100.

SUMMARY OF THE INVENTION

Accordingly, the present invention is directed to a display method of an EPD device, which is applicable to shorten the time required for refreshing an image.

The present invention provides a display method of an EPD device, which is applicable to an EPD device having a display area and a plurality of pixels located in the display area. In the display method, firstly, the display area is divided into a plurality of unit areas. A plurality of pixels exist in each of the unit areas. Then, in some unit areas, at least two pixels in each of the unit areas are enabled to respectively display a first color and a second color, such that the first colors and the second colors are mixed to achieve a mixed color in vision. The first color has a maximum gray-level value. The second color has a minimum gray-level value. A gray-level value of the mixed color is between the maximum gray-level value and the minimum gray-level value.

In view of the above, based on the dithering principle, the first colors and the second colors can be mixed to achieve a mixed color in vision, so as to enable the display area to present colors with different saturation. Thus, the present invention can refresh the image without requiring a reset voltage, so as to shorten the time required for refreshing the image, thereby greatly increasing the image refresh rate.

In order to make the aforementioned features of the present invention more comprehensible, embodiments accompanied with figures are described in detail below.

DETAILED DESCRIPTION OF THE INVENTION

Figure 2A:
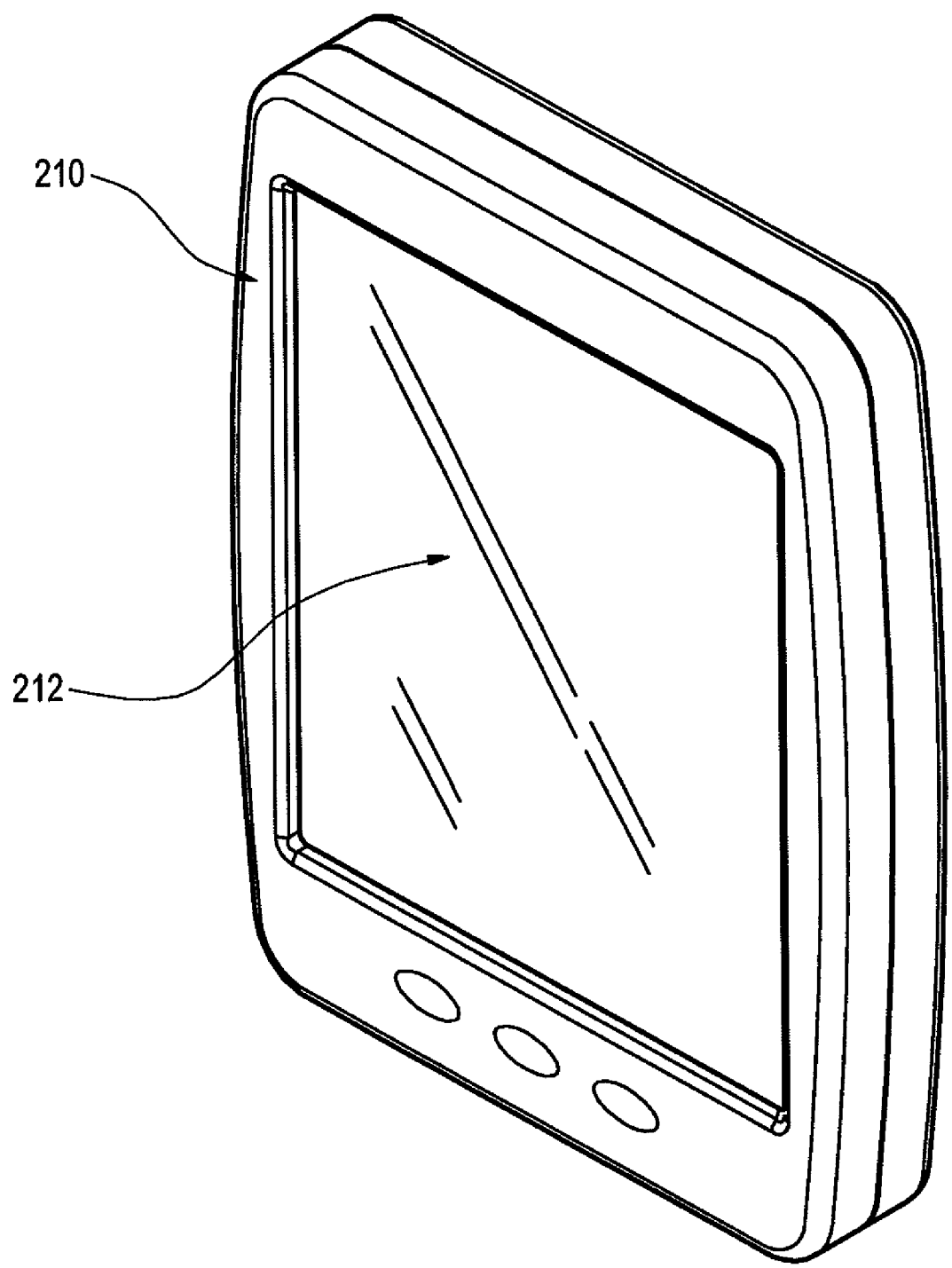
FIG. 2A is a three-dimensional schematic view of an electronic book using a display method of an EPD device according to an embodiment of the present invention.

FIG. 2A is a three-dimensional schematic view of an electronic book using a display method of an EPD device according to an embodiment of the present invention. Referring to FIG. 2A, the display method of this embodiment can be applied in an electronic book 200 having an EPD device 210. In other embodiments (not shown), the EPD device 210 may also be applied in an electronic paper, an electronic billboard, and an electronic tag. In other words, the display method of this embodiment can also be applied in an electronic paper, an electronic billboard, and an electronic tag.

Figure 2B:
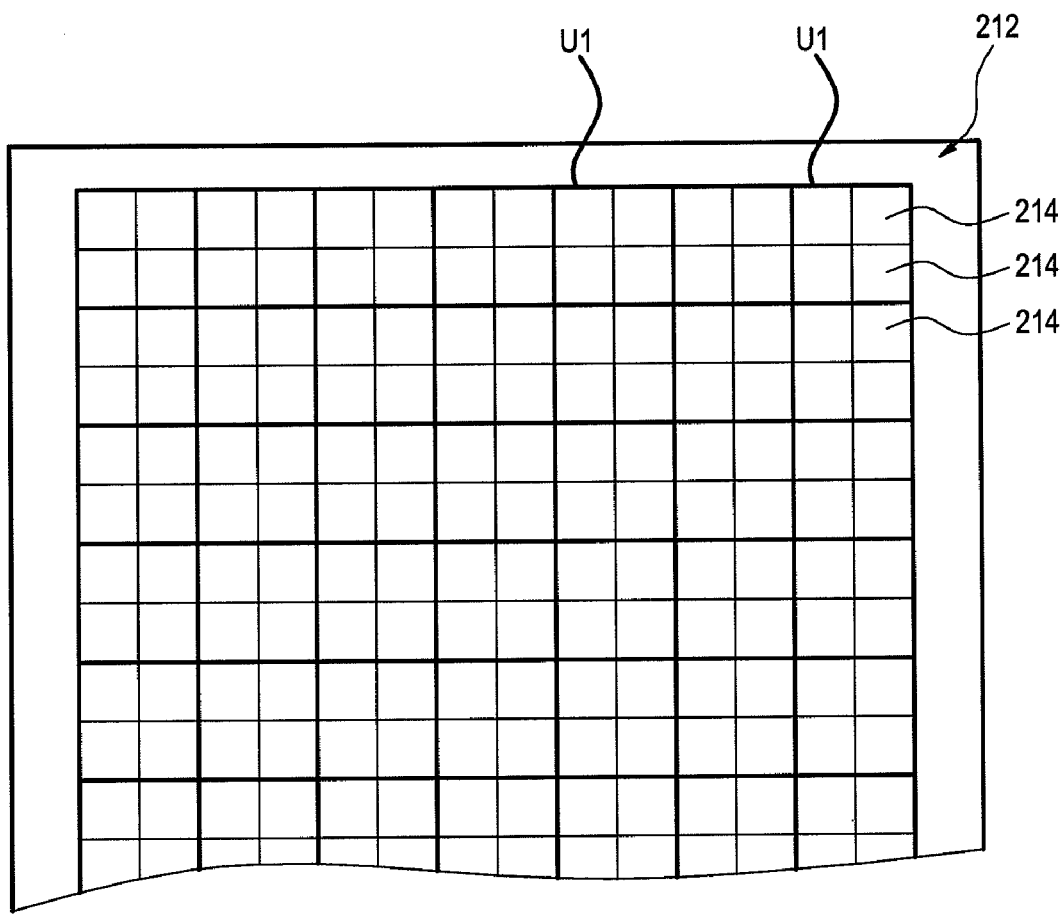
FIG. 2B is a schematic front view of the EPD device in FIG. 2A.

FIG. 2B is a schematic front view of the EPD device in FIG. 2A. Referring to FIGS. 2A and 2B, the EPD device 210 has a display area 212 and a plurality of pixels 214 located in the display area 212. An image displayed by the EPD device 210 is presented in the display area 212.

Each pixel 214 can only display a single color, and the color displayed by each pixel 214 only has a single gray-level value. Taking the 8-bit (256 gray levels) mode as an example, the gray-level value of the color displayed by each pixel 214 is between 0 and 255. However, in the display method of the present invention, the gray-level value of the color displayed by each pixel 214 is only a maximum gray-level value or a minimum gray-level value. For example, when the EPD device 210 displays an image using the 8-bit (256 gray levels) mode, the gray-level value of the color displayed by each pixel 214 can only be 0 or 255.

Figure 3:
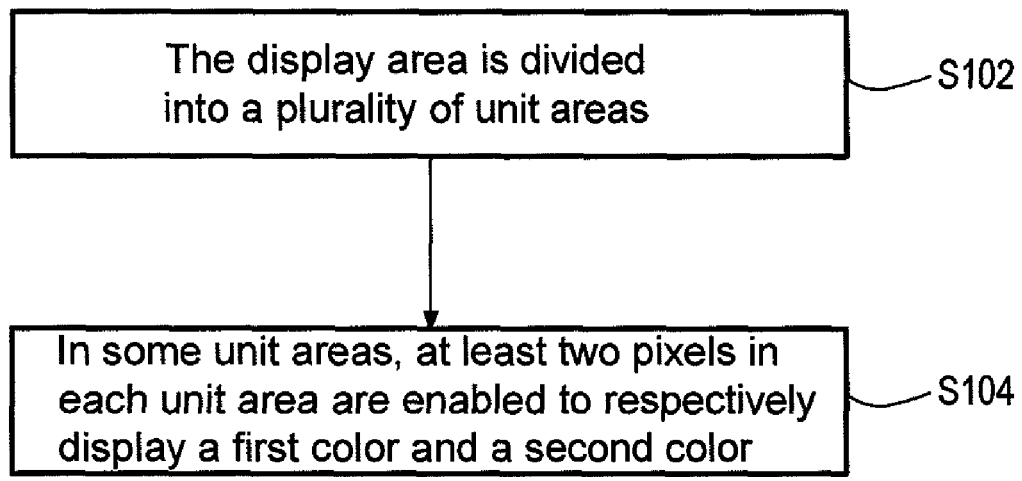
FIG. 3 is a schematic flow chart of a display method of an EPD device according to an embodiment of the present invention.

FIG. 3 is a schematic flow chart of a display method of an EPD device according to an embodiment of the present invention. Referring to FIGS. 2B and 3, in the display method of this embodiment, firstly, Step S102 is performed, that is, the display area 212 is divided into a plurality of unit areas U1. As shown in FIG. 2B, the unit areas U1 are areas enclosed by bold black lines.

Figure 2C:
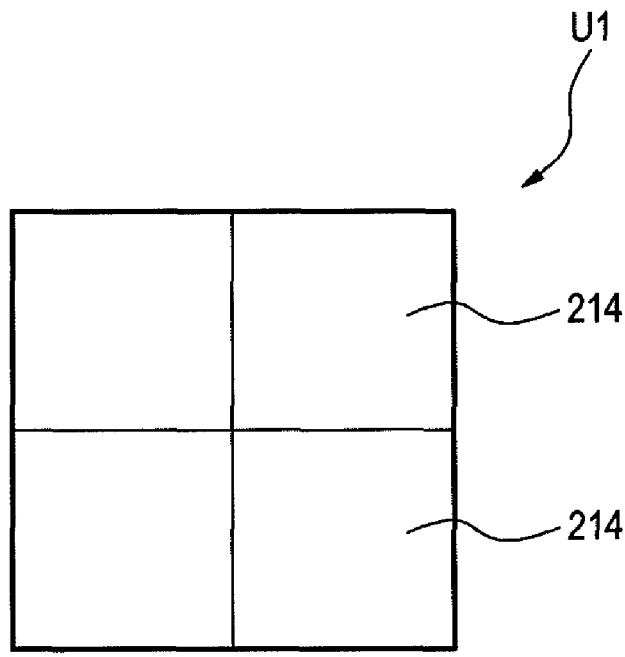
FIG. 2C is a schematic view of a unit area in FIG. 2B.

FIG. 2C is a schematic view of a unit area in FIG. 2B. Referring to FIGS. 2B and 2C, the pixels 214 are located in the unit areas U1, and a plurality of pixels 214 exist in each unit area U1. The pixels 214 in each unit area U1 may be arranged into a rectangular shape, that is, the pixels 214 are arranged into an M×N matrix, in which both M and N are positive integers, and the number of the pixels 214 in each unit area U1 is M×N.

In this embodiment, M is equal to N. Taking FIG. 2C as an example, both M and N are equal to 2, that is, the pixels 214 in each unit area U1 are arranged into a 2×2 matrix. Moreover, the unit areas U1 may be in rectangular shapes, and the pixels 214 in each unit area U1 may be arranged into a square shape, as shown in FIG. 2C.

Although the pixels 214 shown in FIG. 2C are arranged into the 2×2 matrix, in other embodiments (not shown), the pixels 214 in each unit area U1 may be arranged into a 3×3, 4×4, or 5×5 matrix, that is to say, both M and N may be positive integers greater than 2. Therefore, the pixels 214 that are arranged into the 2×2 matrix shown in FIG. 2C are merely illustrated as an example, but not intended to limit the present invention.

Figure 2D:
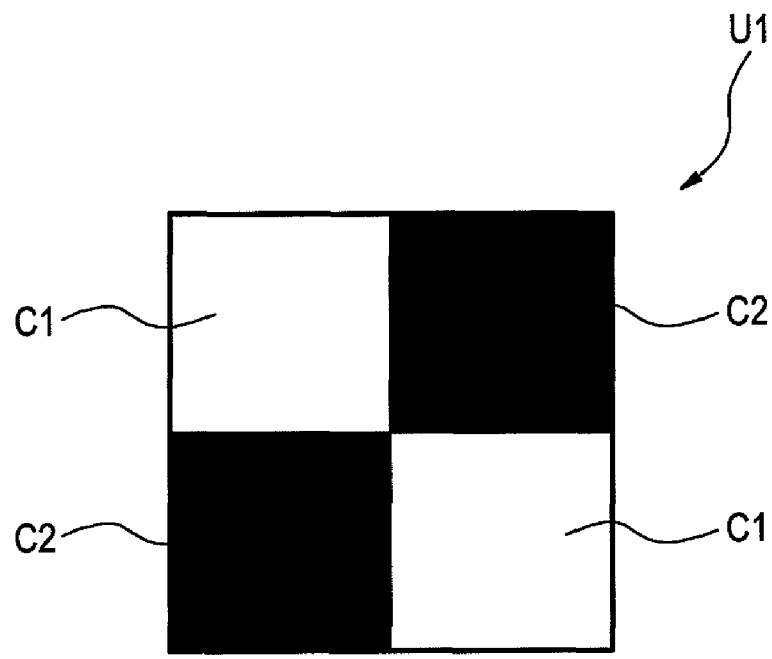
FIG. 2D is a schematic view of pixels in FIG. 2C when displaying first colors and second colors.
Figure 2E:
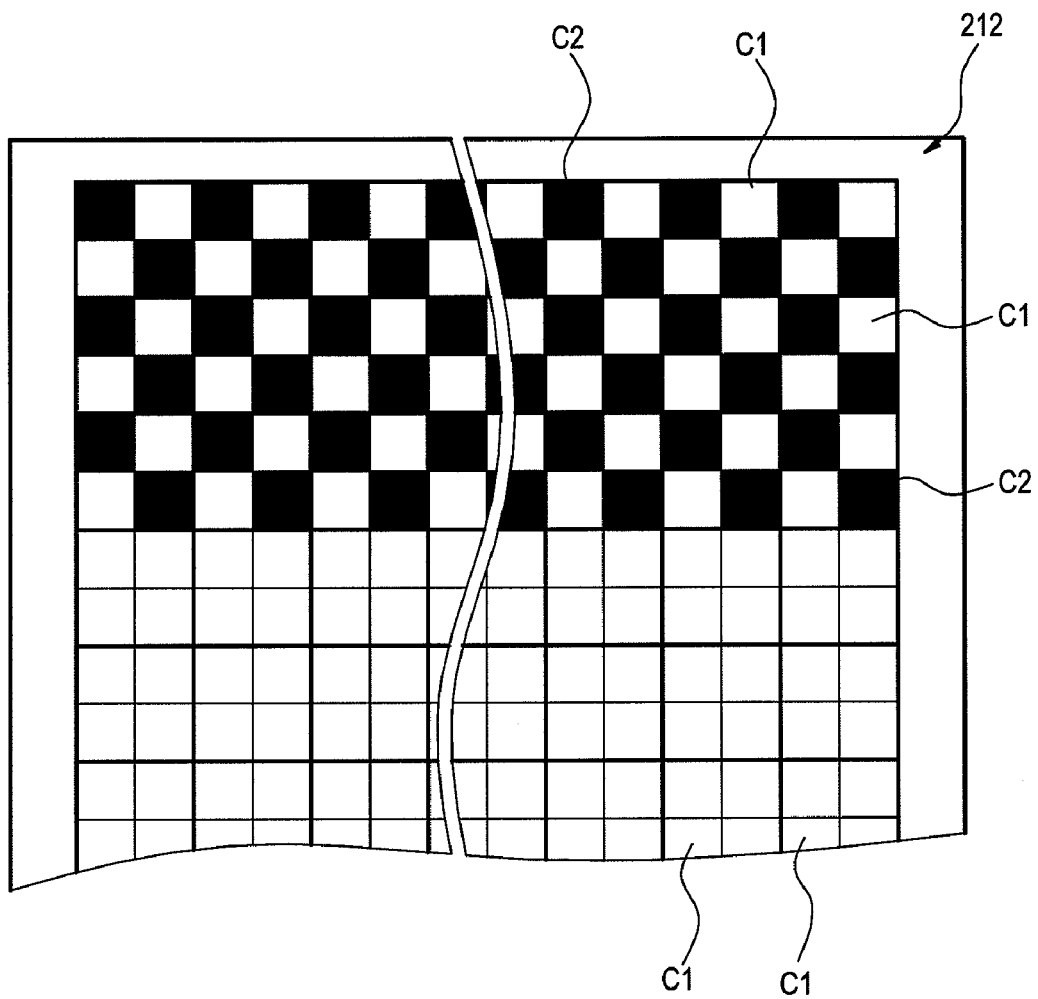
FIG. 2E is a schematic front view of the EPD device in FIG. 2B when displaying an image.

FIG. 2D is a schematic view of pixels in FIG. 2C when displaying first colors and second colors, and FIG. 2E is a schematic front view of the EPD device in FIG. 2B when displaying an image. Referring to FIGS. 2D, 2E, and 3, after Step S102, Step S104 is performed, that is, in some unit areas U1, at least two pixels 214 in each unit area U1 are enabled to respectively display a first color C1 and a second color C2.

In detail, taking FIG. 2E as an example, in some unit areas U1 (for example, a plurality of unit areas U1 located in an upper half of the display area 212 in FIG. 2E), the number of the pixels 214 displaying the first color C1 and the number of the pixels 214 displaying the second color C2 in each unit area U1 are both at least one. But in some other unit areas U1 (for example, a plurality of unit areas U1 located in a lower half of the display area 212 in FIG. 2E), the pixels 214 only display the first color C1.

The first color C1 has the maximum gray-level value, and the second color C2 has the minimum gray-level value. In detail, taking the 8-bit (256 gray levels) mode as an example, the maximum gray-level value is 255, and the minimum gray-level value is 0, so that the gray-level value of the first color C1 is 255, and the gray-level value of the second color C2 is 0. In addition, in this embodiment, the EPD device 210 may be a black-white image display device, that is, the EPD device 210 can only display black-white images, so that the pixels 214 can only display black, white, or gray, in which the first color C1 is white, and the second color C2 is black, as shown in FIGS. 2D and 2E.

For example, in the unit area U1 shown in FIG. 2D, two pixels 214 display the first color C1 (for example, white), and the other two pixels 214 display the second color C2 (for example, black), so that the number of the pixels 214 displaying the first color C1 and the number of the pixels 214 displaying the second color C2 are both two.

However, in other embodiments (not shown), the number of the pixels 214 displaying the first color C1 is not necessarily equal to the number of the pixels 214 displaying the second color C2. For example, it is possible that three pixels 214 display the first color C1 (e.g. white) and the other one pixel 214 displays the second color C2 (e.g. black) in the unit area U1 of FIG. 2D. Therefore, the mode of displaying the colors as shown in FIG. 2D is merely illustrated as an example, but not intended to limit the present invention.

When the pixels 214 display the first color C1 and the second color C2, the first colors C1 and the second colors C2 are mixed to achieve a mixed color in vision, in which a gray-level value of the mixed color is between the maximum gray-level value and the minimum gray-level value. In detail, when the EPD device 210 has sufficient pixels 214, and each pixel 214 has a quite small area, for example, the area of each pixel 214 is too small to be distinguished with naked eyes, the first colors C1 and the second colors C2 in the display area 212 are mixed in vision based on the dithering principle. At this time, it seems for the viewers that the EPD device 210 displays a mixed color with a gray-level value between the maximum gray-level value and the minimum gray-level value, which is, for example, gray.

Moreover, the EPD device 210 may be applied in an electronic billboard. When the EPD device 210 is applied in a large electronic billboard, the first colors C1 and the second colors C2 may also be mixed in vision based on the dithering principle, so that a distant viewer believes that the large electronic billboard displays a mixed color.

According to the above, although the color displayed by each pixel 214 only has the maximum gray-level value or the minimum gray-level value, the EPD device 210 may display a mixed color in vision based on the dithering principle, so as to enable the display area 212 to present colors with different saturation, thereby displaying gray-level images.

Figure 1A:
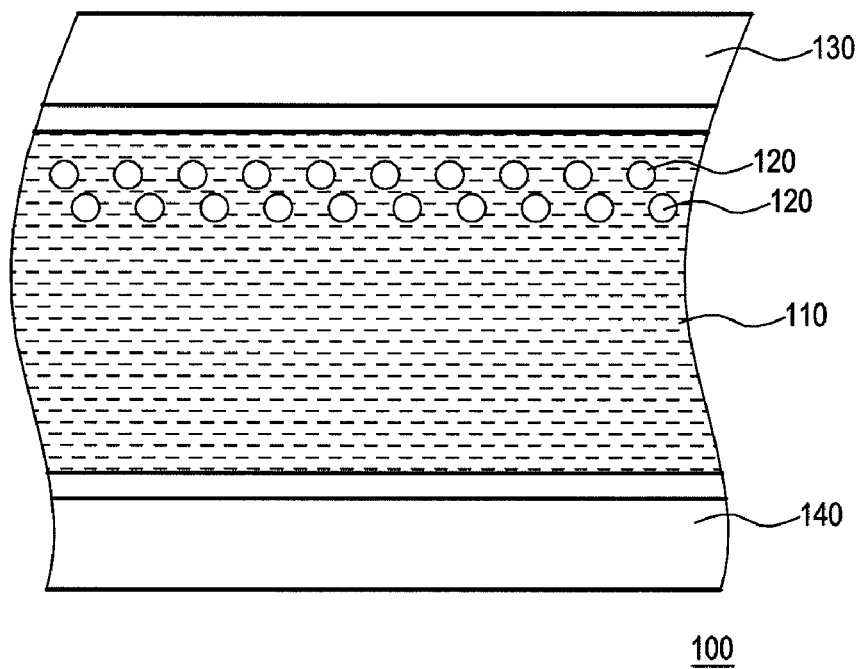
FIG. 1A is a schematic cross-sectional view of a conventional EPD device.

In addition, the EPD device 210 may have the same structure as a conventional EPD device, that is, the EPD device 210 may be the conventional EPD device 100 shown in FIG. 1A. In other words, the display method of this embodiment can be applied in the current EPD device (for example, the EPD device 100).

Since the color displayed by each pixel 214 only has the maximum gray-level value or the minimum gray-level value, if the EPD device 210 has the same structure as the conventional EPD device, the display method of this embodiment can enable all of the charged particles of the EPD device 210 (referring to FIG. 1A) to move to the common electrode or the pixel electrode, rather than other positions.

Figure 1B:
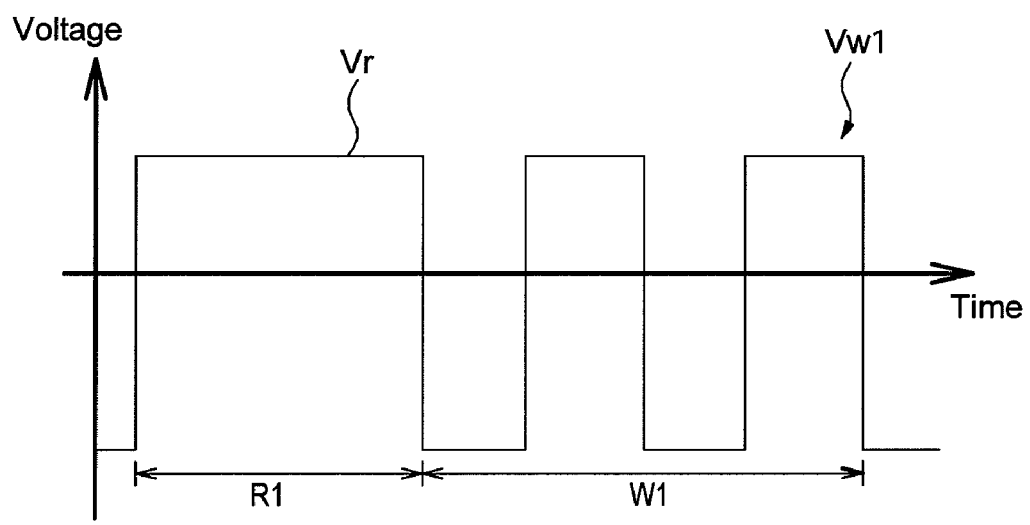
FIG. 1B is a voltage timing chart when the EPD device in FIG. 1A is driven.

Therefore, in the image refresh process, this embodiment can refresh the image of the EPD device 210 without requiring the reset voltage (referring to FIG. 1B). Thus, the reset time may be omitted, such that the time required for refreshing the image is shortened, thereby increasing the image refresh rate.

Figure 4:
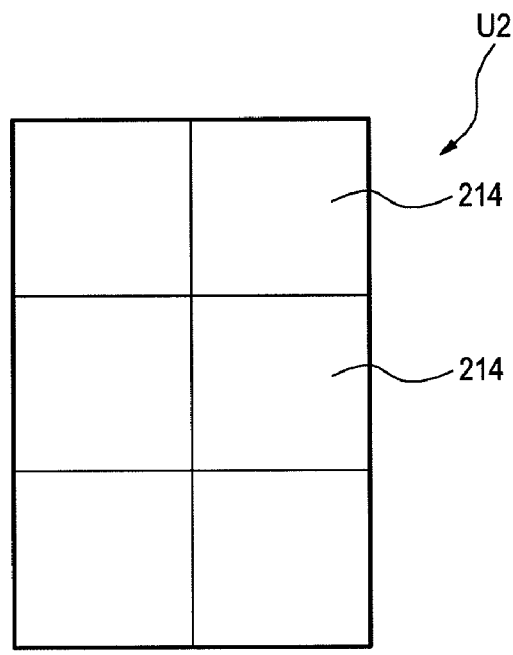
FIG. 4 is a schematic view of a unit area according to another embodiment of the present invention.

FIG. 4 is a schematic view of a unit area according to another embodiment of the present invention. Referring to FIG. 4, the display method of this embodiment is similar to the display method of the above embodiment, and the difference there-between is that, in the embodiment shown in FIG. 4, the arrangement of a plurality of pixels 214 in each unit area U2 are different from that in the unit area U1 in FIG. 2C.

In particular, although a plurality of pixels 214 in the unit area U2 shown in FIG. 4 are arranged into an M×N matrix, M is not equal to N, and both M and N are positive integers. Taking FIG. 4 as an example, the pixels 214 in the unit area U2 are arranged into a 2×3 matrix, and the pixels 214 in the unit area U2 are arranged into a rectangular shape.

Although the pixels 214 shown in FIG. 4 are arranged into the 2×3 matrix, in other embodiments (not shown), the pixels 214 in the unit area U2 may be arranged into a 1×2, 3×5, or 3×1 matrix. Therefore, the pixels 214 arranged into the 2×3 matrix as shown in FIG. 4 are merely illustrated as an example, but not intended to limit the present invention.

Figure 5:
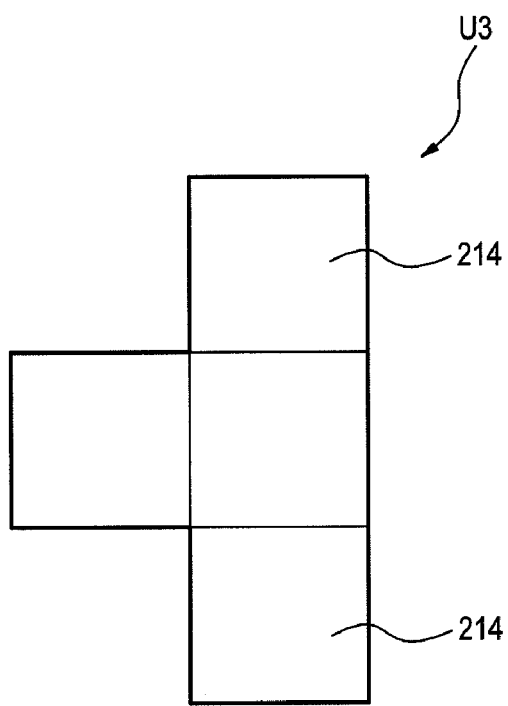
FIG. 5 is a schematic view of a unit area according to another embodiment of the present invention.
Figure 6:
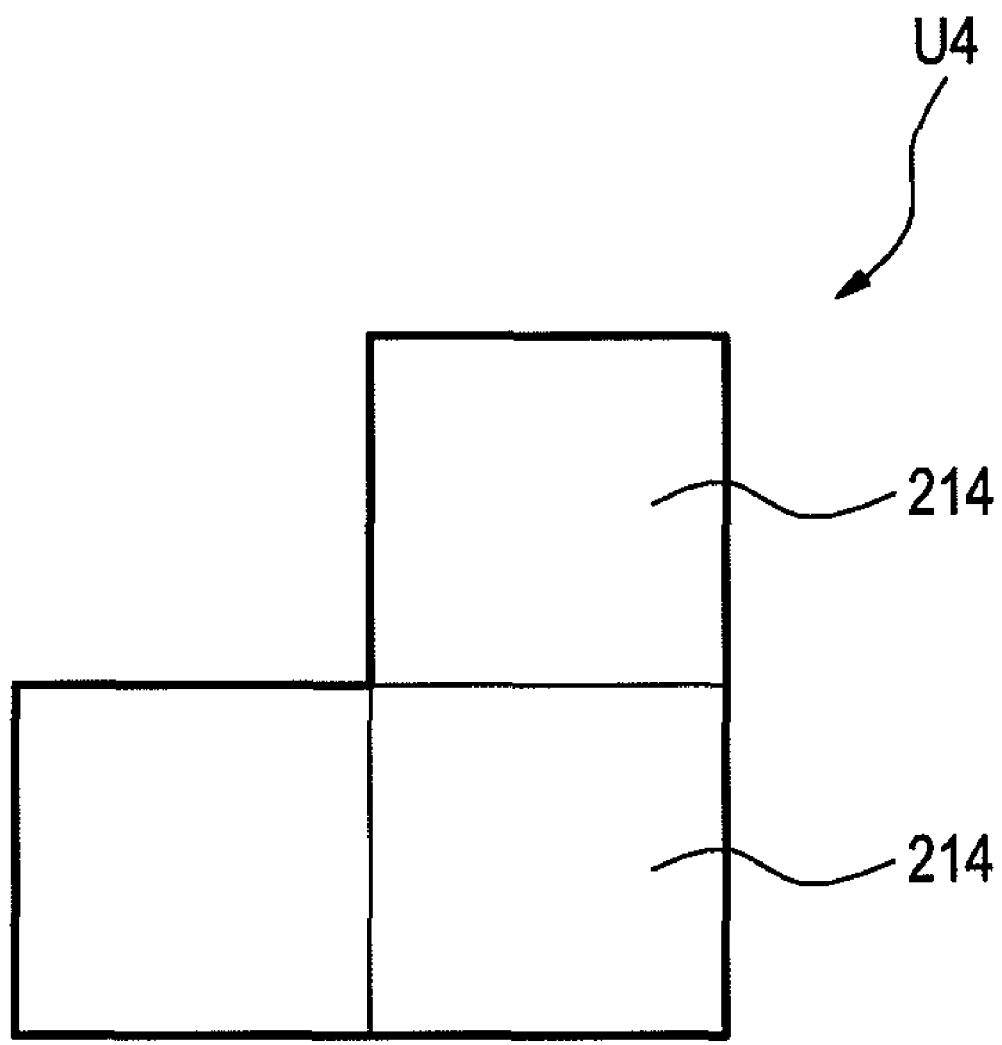
FIG. 6 is a schematic view of a unit area according to another embodiment of the present invention.

It should be noted that, although the pixels 214 in the unit areas U1 and U2 disclosed in the above embodiments are arranged into matrixes, in other embodiments, the pixels 214 in each unit area may also be arranged into other shapes. For example, the pixels 214 may be arranged into a T shape, such as a unit area U3 shown in FIG. 5; or, the pixels 214 may also be arranged into an L shape, such as a unit area U4 shown in FIG. 6.

Based on the above, in the display method of an EPD device of the present invention, although the color displayed by each pixel only has the maximum gray-level value (for example, white) or the minimum gray-level value (for example, black), the EPD device can display a mixed color with a gray-level value between the maximum gray-level value and the minimum gray-level value in vision based on the dithering principle, so as to enable the display area to present colors with different saturation, thereby generating gray-level images.

Moreover, since the color displayed by each pixel only has the maximum gray-level value or the minimum gray-level value, the display method of an EPD device of the present invention can refresh the image without requiring the reset voltage. Thus, in the image refresh process, the reset time is omitted in the present invention, and the EPD device can immediately receive the write voltage to refresh the image without undergoing the reset time. Therefore, the present invention can shorten the time required for refreshing the image, thereby greatly increasing the image refresh rate.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A display method of an electrophoresis display (EPD) device, applicable to the EPD device having a display area and a plurality of pixels located in the display area, the display method comprising:

dividing the display area into a plurality of unit areas, wherein a plurality of pixels exist in each of the unit areas; and in some unit areas, enabling at least two pixels in each of the unit areas to respectively display a first color and a second color, such that the first colors and the second colors are mixed to achieve a mixed color in vision, wherein the first color has a maximum gray-level value, the second color has a minimum gray-level value, and a gray-level value of the mixed color is between the maximum gray-level value and the minimum gray-level value.

2. The display method of an EPD device according to claim 1, wherein the pixels in each of the unit areas are arranged into a T shape.

3. The display method of an EPD device according to claim 1, wherein the pixels in each of the unit areas are arranged into an L shape.

4. The display method of an EPD device according to claim 1, wherein the pixels in each of the unit areas are arranged into an M×N matrix, and both M and N are positive integers.

5. The display method of an EPD device according to claim 4, wherein M is not equal to N.

6. The display method of an EPD device according to claim 4, wherein M is equal to N.

7. The display method of an EPD device according to claim 1, wherein the first color is white, and the second color is black.

* * * * *